US006732885B2

(12) United States Patent
Mathues

(10) Patent No.: US 6,732,885 B2
(45) Date of Patent: May 11, 2004

(54) BEVERAGE SUPPLY SYSTEM

(75) Inventor: John H. Mathues, Evergreen, CO (US)

(73) Assignee: Hymore, Inc., Evergreen, CO (US)

( * ) Notice: Subject to any disclaimer, the term of this patent is extended or adjusted under 35 U.S.C. 154(b) by 53 days.

(21) Appl. No.: 10/229,672

(22) Filed: Aug. 27, 2002

(65) Prior Publication Data

US 2004/0040977 A1 Mar. 4, 2004

(51) Int. Cl.[7] .................................................. G01F 11/00

(52) U.S. Cl. ................................ 222/1; 222/61; 222/66; 222/67; 222/185.1; 222/386.5

(58) Field of Search ................................ 222/1, 61, 64, 222/66, 67, 146.6, 185.1, 386.5

(56) References Cited

U.S. PATENT DOCUMENTS

| | | | | | |
|---|---|---|---|---|---|
| 3,967,638 | A | | 7/1976 | Tondreau | 137/216 |
| 4,036,406 | A | | 7/1977 | Jespersen et al. | 222/181 |
| 4,207,994 | A | | 6/1980 | Offlee, Sr. | 222/146 R |
| 4,597,270 | A | | 7/1986 | Kerr | 62/138 |
| 4,635,673 | A | | 1/1987 | Gerdes | 137/216 |
| 4,815,941 | A | | 3/1989 | Fayo | 417/44 |
| 4,848,097 | A | | 7/1989 | Roberts | 62/135 |
| 4,852,621 | A | | 8/1989 | Bear | 141/83 |
| 4,921,135 | A | | 5/1990 | Pleet | 222/82 |
| 4,941,806 | A | | 7/1990 | Brown et al. | 417/38 |
| 4,958,747 | A | * | 9/1990 | Sheets | 222/67 |
| 4,987,746 | A | | 1/1991 | Roberts | 62/137 |
| 5,042,689 | A | | 8/1991 | Mrugala et al. | 222/66 |
| 5,351,859 | A | | 10/1994 | Jansen | 222/82 |
| 5,402,836 | A | | 4/1995 | Hasper et al. | 141/364 |
| 5,454,944 | A | | 10/1995 | Clack | 210/257.1 |
| 5,538,160 | A | * | 7/1996 | Ziesel | 222/1 |
| 5,558,256 | A | | 9/1996 | Miller et al. | 222/189.09 |
| 5,638,991 | A | | 6/1997 | Todden et al. | 222/113 |
| 5,647,416 | A | | 7/1997 | Desrosiers et al. | 141/351 |
| 5,743,433 | A | * | 4/1998 | Hawkins et al. | 222/64 |
| 5,855,296 | A | * | 1/1999 | McCann et al. | 222/61 |
| 5,901,880 | A | | 5/1999 | Clarke | 222/63 |
| 5,947,339 | A | | 9/1999 | Boshears et al. | 222/183 |
| 6,068,162 | A | | 5/2000 | De Winter et al. | 222/181.3 |
| 6,167,921 | B1 | | 1/2001 | Busick et al. | 141/18 |
| 6,196,418 | B1 | * | 3/2001 | McCann et al. | 222/61 |
| 6,351,966 | B1 | | 3/2002 | Hochberg | 62/340 |
| 6,352,183 | B1 | | 3/2002 | Kristiansen et al. | 222/325 |

* cited by examiner

*Primary Examiner*—Joseph A. Kaufman
(74) *Attorney, Agent, or Firm*—Merchant & Gould PC

(57) ABSTRACT

A beverage supply system includes a beverage container having an outlet. A first reservoir is connected to the beverage container outlet to receive beverage from the beverage container under force of gravity. A pump is connected to the first reservoir, and a second reservoir is connected to the pump, the second reservoir defining an expandable beverage chamber. The pump is activated to pump beverage from the first reservoir to the second reservoir only when a first quantity of beverage in the first reservoir is within a first quantity range and a second quantity of beverage in the second reservoir is below a second quantity range. The system also includes a beverage dispenser connected to the second reservoir. A method of supplying beverage from a beverage container to a beverage dispenser includes supplying beverage from a beverage container to a first reservoir under force of gravity. The method also includes pumping the beverage from the first reservoir to an expandable pressurized chamber of a second reservoir when a first quantity of beverage in the first reservoir is within a first quantity range and a second quantity of beverage in the second reservoir is below a second quantity range. The method additionally includes intermittently connecting the pressurized chamber to an outlet of a beverage dispenser to supply beverage from the second reservoir to the beverage dispenser without pumping the beverage from the second reservoir to the beverage dispenser.

33 Claims, 8 Drawing Sheets

BEVERAGE SUPPLY SYSTEM

FIELD OF THE INVENTION

This application relates generally to bottled beverage supply systems and more particularly to a bottled beverage supply system that pumps beverage to a reservoir, which in turn supplies the beverage to a dispenser.

BACKGROUND OF THE INVENTION

Due to high levels of impurities found in many domestic water supplies, a substantial number of households and offices prefer not to use their domestic water supplies as a source of drinking water, when making ice, or when making coffee or the like. As a consequence, such households frequently purchase bottled water for such uses. While there are numerous devices for dispensing bottled water and other bottled beverages for drinking purposes, it is considerably more difficult to supply bottled water to the icemaker or chilled water dispenser of a refrigerator. Typically, a water supply line for a refrigerator is connected directly to the domestic water supply, perhaps with a filter installed between them. Thus, if bottled water is to be supplied to a refrigerator, it should be supplied under a pressure comparable to that of the domestic water supply system.

Prior devices for supplying pressurized bottled water to a refrigerator or other water dispenser have not proven to be commercially viable. For example, some such systems have often required activation of a pump each time water is supplied to the dispenser. Thus, each time a user gets water from a refrigerator or otherwise uses the water supply, the pump is activated. This is both an annoyance to the user and a waste of energy. Other systems have required the use of a dip leg and its attendant inefficiencies, such as wasted water.

Accordingly there is a need for a reliable and convenient system for supplying water or other beverages from a bottle to a dispenser, such as a refrigerator. The present invention provides a solution to this and other problems, and offers other advantages over the prior art.

SUMMARY OF THE INVENTION

Against this backdrop the present invention has been developed. An embodiment of the present invention is a beverage supply system. The system includes a beverage container having a bottom outlet. A first reservoir is connected to the beverage container outlet to receive beverage from the beverage container under force of gravity. A pump is connected to the first reservoir, and a second reservoir is connected to the pump, the second reservoir defining an expandable beverage chamber. The pump is activated to pump beverage from the first reservoir to the second reservoir only when a first quantity of beverage in the first reservoir is within a first quantity range and a second quantity of beverage in the second reservoir is below a second quantity range. The system also includes a beverage dispenser connected to the second reservoir.

Stated another way, an embodiment of the present invention is a beverage supply system that includes a first reservoir adapted to receive beverage from a beverage container under force of gravity within a first quantity range. The system also includes a pump connected to the first reservoir, and a second reservoir connected to the pump. The second reservoir includes a solid barrier adapted to press against a second quantity of beverage within the second reservoir as the second quantity of beverage within the second reservoir displaces the barrier to produce a pressure. The second reservoir is adapted to supply beverage to a beverage dispenser without the pump being operated. The pump is activated to pump beverage from the first reservoir to the second reservoir only when a first quantity of beverage in the first reservoir is within the first quantity range and a second quantity of beverage in the second reservoir is below a second quantity range.

Stated yet another way, an embodiment of the present invention is a method of supplying beverage from a beverage container to a beverage dispenser. The method includes supplying beverage from a beverage container to a first reservoir. The method also includes pumping the beverage from the first reservoir to an expandable pressurized chamber of a second reservoir when a first quantity of beverage in the first reservoir is within a first quantity range and a second quantity of beverage in the second reservoir is below a second quantity range. The method additionally includes intermittently connecting the pressurized chamber to an outlet of a beverage dispenser to supply beverage from the second reservoir to the beverage dispenser without pumping the beverage from the second reservoir to the beverage dispenser.

These and various other features as well as advantages which characterize the present invention will be apparent from a reading of the following detailed description and a review of the associated drawings.

DETAILED DESCRIPTION

Figure 1:
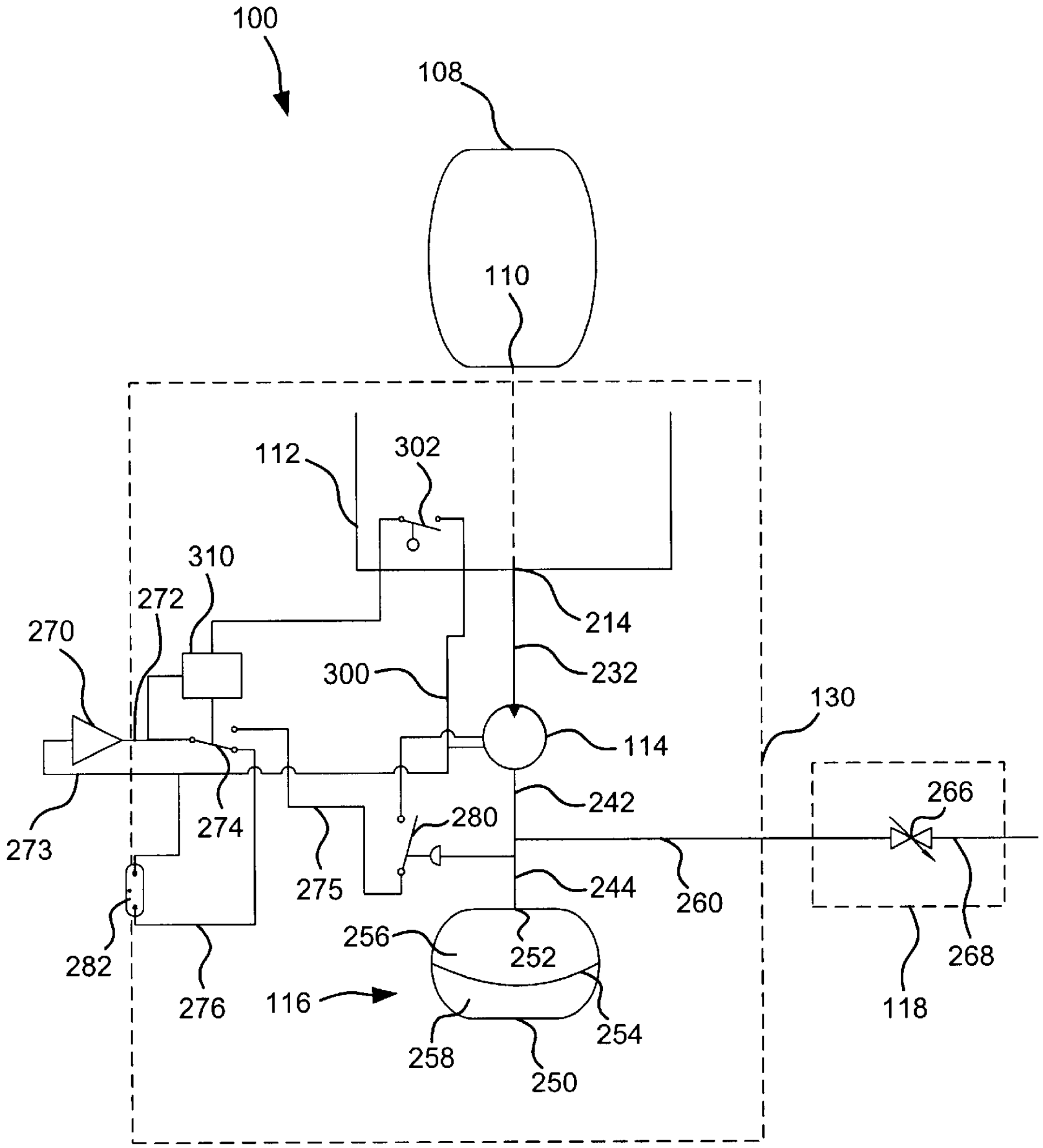
FIG. 1 is a schematic diagram of the beverage supply system according to an embodiment of the present invention.

Referring to FIGS. 1–5, a bottled beverage supply system 100 generally includes a beverage bottle or container 108, such as a conventional water bottle, having an outlet 110 that feeds into a first reservoir 112. A pump 114 pumps beverage from the first reservoir 112 to a pressurized second reservoir 116. The beverage is then supplied from the second reservoir 116 to a beverage dispenser 118. Because the second reservoir 116 is pressurized, beverage can be supplied from the second reservoir 116 to the beverage dispenser 118 without operating the pump 114. The pump 114 only needs to be activated when the quantity of beverage in the second reservoir 116 becomes too low. Thus, the bottled beverage supply system 100 preferably supplies pressurized beverage to the beverage dispenser 118 in an efficient manner without requiring the pump 114 to be constantly operated while beverage is being supplied to the beverage dispenser 118.

Figure 2:
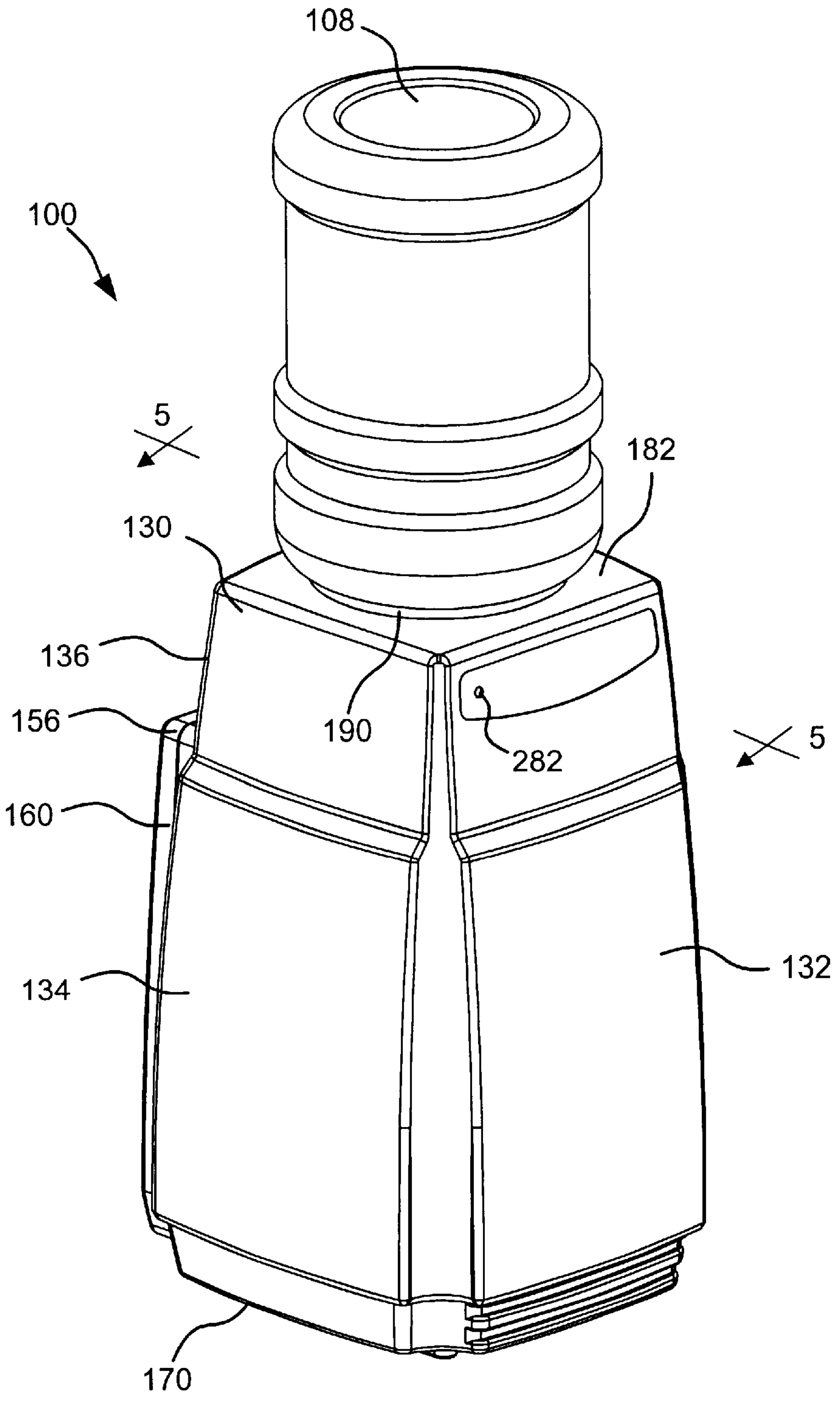
FIG. 2 is a front perspective view of a beverage supply system according to an embodiment of the present invention.
Figure 3:
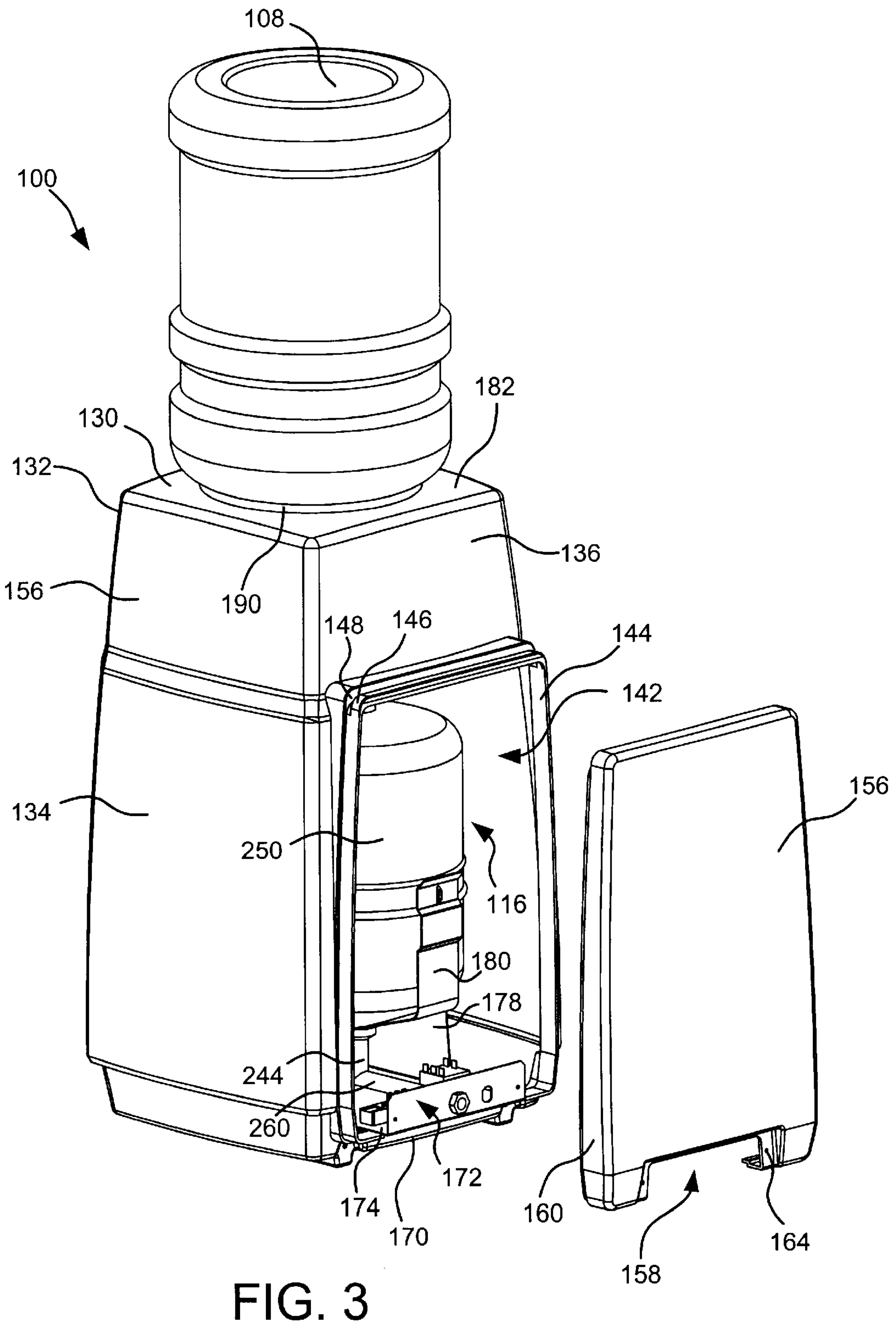
FIG. 3 is a rear perspective view of the beverage supply system of FIG. 2 with its access door removed.
Figure 4:
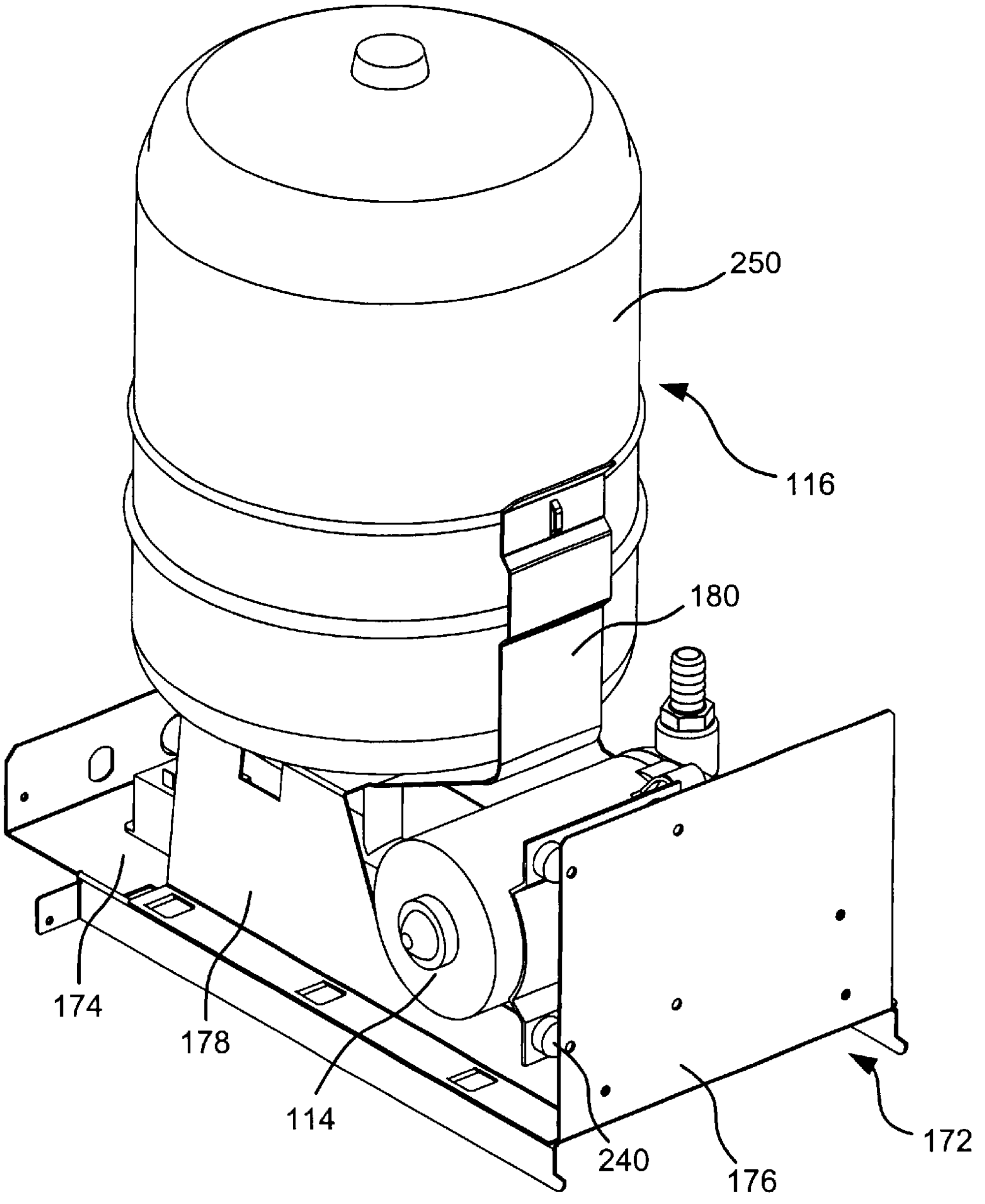
FIG. 4 is a front separate perspective view of the support frame, the second reservoir, and the pump of the beverage supply system of FIG. 2.
Figure 5:
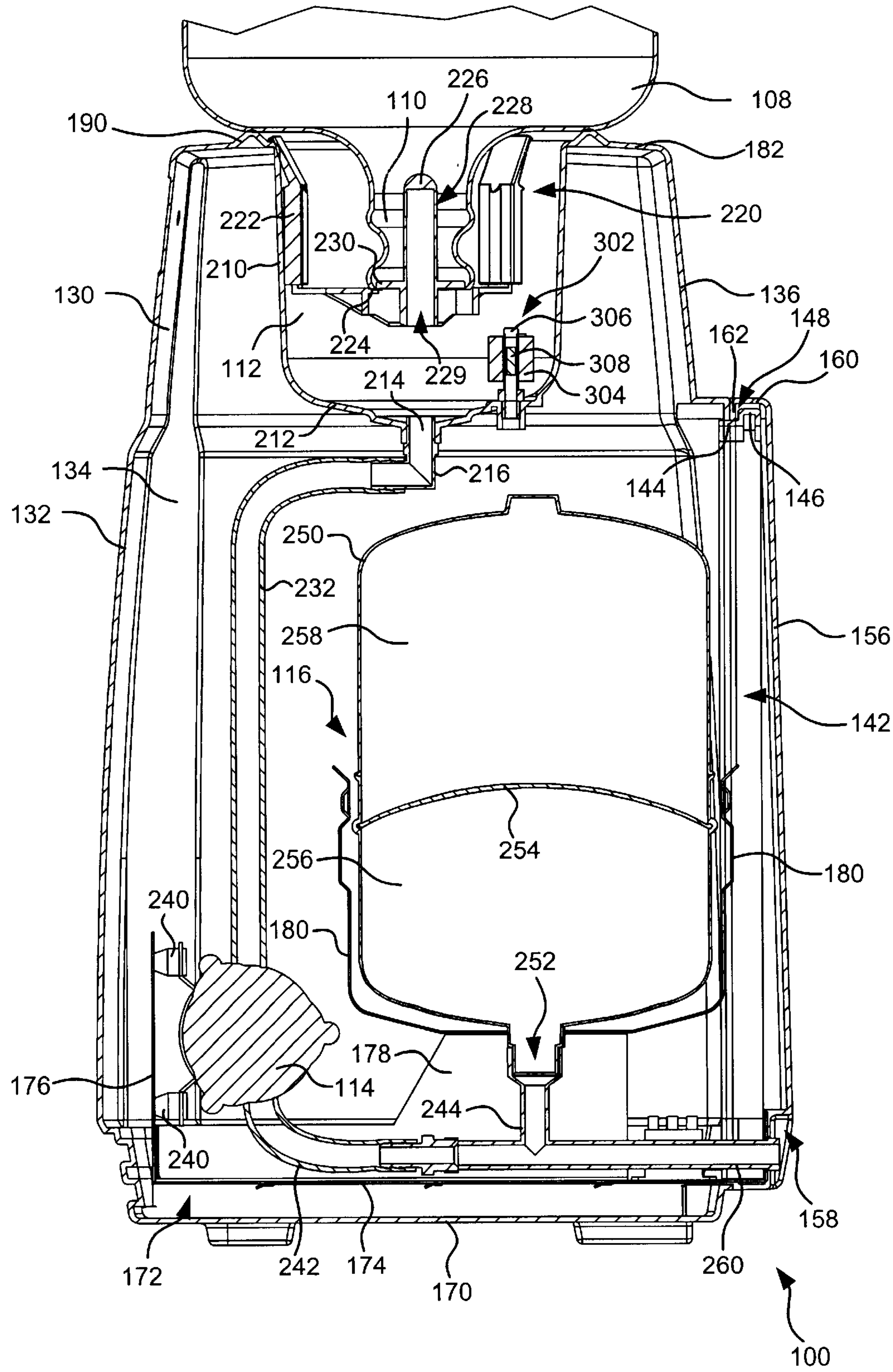
FIG. 5 is a sectional view taken along line 5—5 of FIG. 2.

Referring still to FIGS. 2–3 and 5, and describing the bottled beverage supply system 100 in more detail, a housing 130 has a substantially rectangular front wall 132, a pair of substantially rectangular side walls 134 extending back from opposite side edges of the front wall 132, and a substantially rectangular rear wall 136 extending between the rear edges of the side walls 134. A substantially rectangular door opening 142 in the rear wall 136 provides access to the interior space of the housing 130. A housing collar 144 extending about the periphery of the door opening 142 protrudes rearward, and a lip 146 extends up from the rear edge of the top of the housing collar 144 to define a channel 148 between the lip 146 and the fear wall 136. A substantially rectangular door 156 spans the door opening 142, but includes a cutout 158 from its bottom edge to provide limited access to the interior space of the housing 130 while the door is mounted on the housing 130. The door 156 also includes a door collar 160 extending forward from the periphery of the door 156 and a lip 162 extending down from the front edge of the top of the door collar 160. The door collar 160 fits around the housing collar 144, and the door lip 162 extends down into the channel 148 so that the door lip and the housing lip 146 interlock. The door 156 also includes fastener holes 164 near its bottom edge to facilitate fastening the bottom of the door 156 in place.

A floor 170 of the housing 130 joins the bottom edges of the front wall 132, the side walls 134, and the rear wall 136 to form a bottom closure of the housing 130. A support frame 172 is securely mounted on the floor 170 within the housing 130. The support frame 172 includes a horizontal base 174, a front wall 176 extending up from the front edge of the base 174, and a reservoir pedestal 178 rising above the base 174. A pair of reservoir support arms 180 extend up from front and rear sides of the reservoir pedestal 178 on opposite sides of the second reservoir 116.

A top wall 182 of the housing 130 joins the top edges of the front wall 132, the side walls 134, and the rear wall 136. A centrally located annular ridge 190 preferably protrudes upwardly from the top wall 182 and supports the body of the beverage bottle 108. Referring to FIG. 5, the first reservoir 112 includes an annular side wall 210 that depends from the top wall 182 inside the annular ridge 190. A sloped wall 212 slopes downward and inward from the side wall 210 to an outlet 214. The outlet 214 preferably empties into a fitting 216.

A drain apparatus 220 includes a support structure 222 that extends from the top wall 182 of the housing 130 down and into the first reservoir 112. The support structure 222 supports a mating surface 224 that preferably abuts the rim of the downwardly facing outlet 110 of the bottle 108. The support structure 222 is also preferably positioned and oriented to act as a guide to guide the outlet 110 toward the mating surface 224 when the bottle 108 is positioned on the beverage supply system 100. A drain tube 226 also supported by the support structure 222 preferably extends up into the outlet 110. The drain tube 226 includes top openings 228 at its upward end and a bottom opening 229 at its lower end. A drain tube flange 230 extends outwardly from the drain tube 226 and preferably seals with the mating surface 224. Water is thus supplied to the first reservoir 112 through the drain tube 226 until the level of beverage in the first reservoir rises to the bottom opening 229 and prevents air from entering the drain tube 226.

The housing 130, the first reservoir 112, the support structure 222 are all preferably part of a unitary member. The unitary member is preferably formed of structural polymer material such as a thermoplastic material. The unitary member can be formed by a roto-mold process. Alternatively, the body could be formed as separate members that are joined together. In this case, the body could be formed by a blow mold process.

A pump supply line 232 extends from the fitting 216 to the pump 114. The pump 114 is preferably a positively displaced pump that can produce at least about 100 pounds per square inch of pressure. Alternatively, the pump could be some other type of pump in combination with a check valve to prevent backflow through the pump when the pump is not operated. Pump mounts 240 that are preferably arranged to prevent the transmission of vibrations between the pump 114 and the front wall 176 preferably mount the pump to the front wall 176 of the support frame 172.

A pump exit line 242 extends from an outlet of the pump 114 to a second reservoir line 244. The second reservoir line 244 extends to the second reservoir 116. The second reservoir 116 preferably includes a pressure tank 250 having an inlet and outlet opening 252 attached to the second reservoir line 244. A solid barrier or diaphragm 254 is preferably a thin flexible member that is secured to the sides of the pressure tank 250 and divides the pressure tank 250 into a beverage chamber 256 that opens into the opening 252, and a gas chamber 258 that is filled with a pressurized gas such as air.

Referring to FIG. 1, a dispenser supply line 260 extends from the second reservoir line 244 to the dispenser 118. The dispenser 118 preferably includes a dispenser valve 266 attached to the dispenser supply line 260 and a dispenser exit line 268. The dispenser exit line may be connected to a spigot, an icemaker, or any other device for supplying beverage in liquid or solid form to users.

The various beverage supply lines may be constructed of any suitable material, but they are preferably standard polyethylene tubing such as is often used in supplying drinking water to refrigerators or other beverage dispensers.

A power supply 270 preferably supplies alternating current electrical power, such as from a standard 120-volt outlet. A power switch power line 272 and a constant supply power line 273 are both connected to the power supply 270, with each power line 272, 273 at a different voltage. Accordingly, the power supply 270 will supply power to electrical components that are connected to both the power switch power line 272 and the constant supply power line 273. The power switch power line 272 is connected to a power switch 274, which switches between one position that connects the power switch power line 272 to a pressure switch power line 275 and another position that connects the power switch power line 272 to an indicator power line 276.

The pressure switch power line 275 extends to the pump 114 via a pressure switch 280 that is pneumatically connected to the beverage chamber 256 of the second reservoir 116 via the second reservoir line 244. The pressure switch 280 preferably closes when the pressure within the beverage chamber 256 drops below a pressure range, and preferably reopens when the pressure within the beverage chamber 256 rises above the pressure range. The pressure range is preferably within the required pressure range for the dispenser 118. The pressure range preferably has a lower limit of from about thirty-five to about forty-five psi, and an upper limit of from about sixty to about seventy psi. In a preferred embodiment, the lower limit of the pressure range is about forty psi and the upper limit is about sixty-five psi so that the pressure range is from about forty psi to about sixty psi.

Accordingly, in a preferred embodiment, the pressure switch 280 closes when the pressure within the beverage chamber 256 drops below forty psi, opens when the pressure within the beverage chamber 256 rises above sixty-five psi, and does not switch when the pressure within the beverage chamber 256 is within the pressure range between forty and sixty-five psi.

The pump 114 is constantly connected to the constant supply power line 273. Thus, when the power switch 274 connects the power switch power line 272 to the pressure switch power line 275, and the pressure switch 280 is closed, then the power supply 270 supplies power to the pump 114 and thereby activates the pump 114 to pump beverage from the first reservoir 112 to the second reservoir 116.

The indicator power line 276 extends to an indicator light 282 that is preferably viewable by a user of the beverage supply system 100. The indicator light 282 is also constantly connected to the constant supply power line 273 so that when the power switch 274 connects the power switch power line 272 to the indicator power line 276, then the indicator light 282 receives power from the power supply 270 and is illuminated.

A fluid level switch power line 300 extends from the constant supply power line 273 to a fluid level switch 302. The fluid level switch 302 is preferably driven by the fluid height of the beverage within the first reservoir 112. Preferably, if sufficient beverage is within the first reservoir 112 to be pumped into the second reservoir 116, then the fluid level switch 302 closes. Referring to FIG. 5, the fluid level switch preferably includes an annular float 304 that extends about a sealed cylinder 306 so that the float 304 is able to slide up and down on the sealed cylinder 306 as the beverage level within the first reservoir 112 rises and falls. A follower 308 positioned within the sealed cylinder .306 is magnetically attracted to the float 304 so that the follower 308 moves up and down with the float 304 to actuate the fluid level switch 302.

Referring back to FIG. 1, the fluid switch power line 300 extends from the fluid level switch 302 to a relay 310 that actuates the power switch 274. The relay 310 is preferably constantly connected to the power switch power line 272 so that the relay 310 receives power from the power supply 270 when the fluid level switch 302 is closed. Preferably, if the fluid level switch 302 is closed, indicating the fluid level within the first reservoir 112 is sufficiently high, and then the relay 310 switches the power switch 274 to connect the power switch power line 272 to the pressure switch power line 275. If the fluid level switch 302 is open, then the relay 310 switches the power switch 274 to connect the power switch power line 272 to the indicator power line 276, rather than the pressure switch power line 275.

Thus, the power supply 270 will begin to supply power to activate the pump 114 if: (1) the pressure switch 280 is closed, indicating the pressure of the beverage within the second reservoir 116 is below the operating pressure range, which in turn indicates that the quantity of beverage within the second reservoir 116 is below an operating range; and (2) the fluid level switch 302 is closed, indicating the first reservoir 112 contains sufficient beverage to be supplied by the pump 114 to the second reservoir 116. The power supply 270 will cease supplying power to deactivate the pump 114 if either: (1) the pressure switch 280 opens, indicating the pressure of the beverage within the second reservoir 116 is above the operating pressure range; or (2) the fluid level switch 302 opens, indicating that the beverage level within the first reservoir 112 is not sufficiently high to continue supplying beverage to the second reservoir 116.

Figure 6:
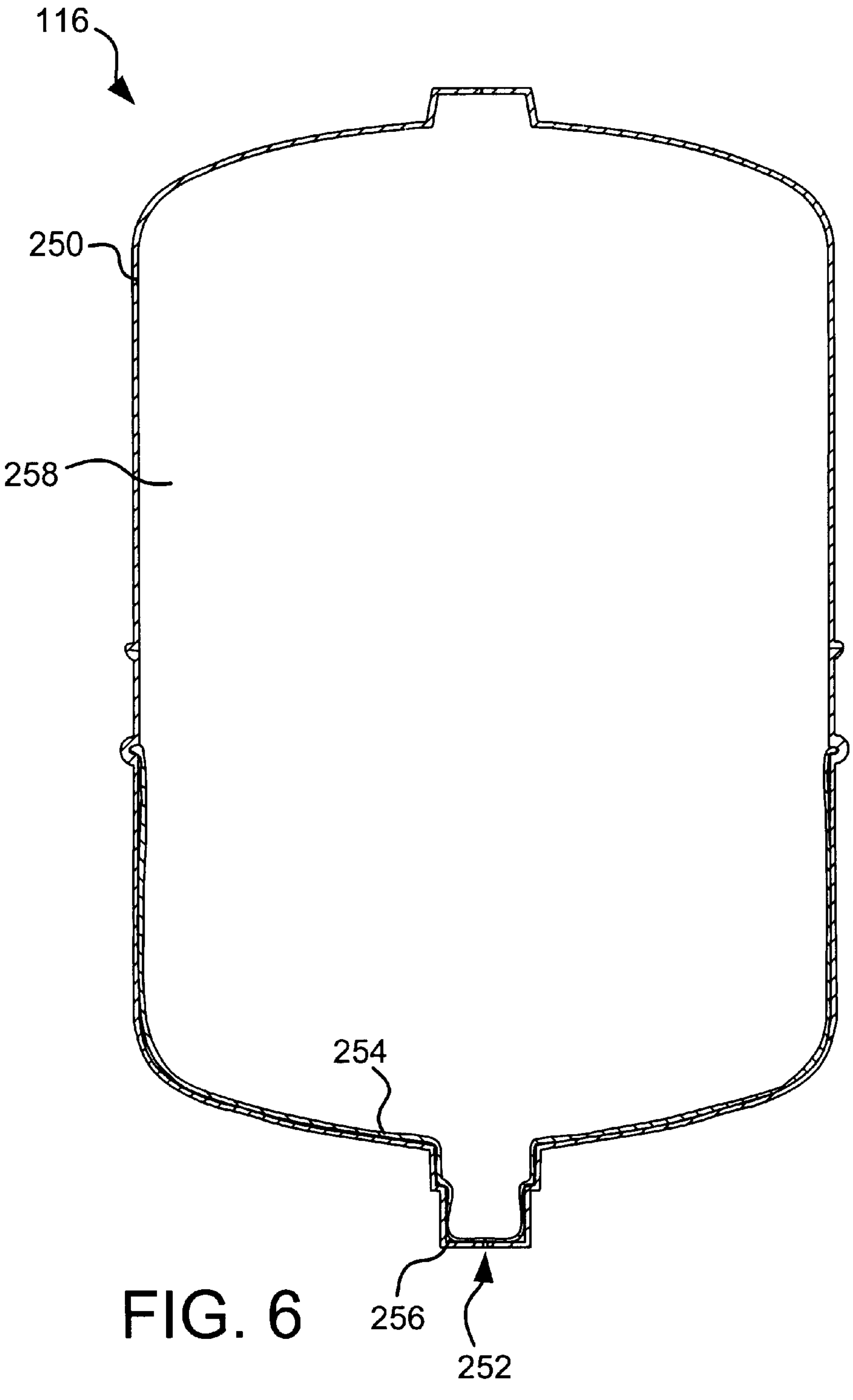
FIG. 6 is a separate sectional view of the second reservoir of the beverage supply system of FIG. 2 with the beverage chamber empty.
Figure 7:
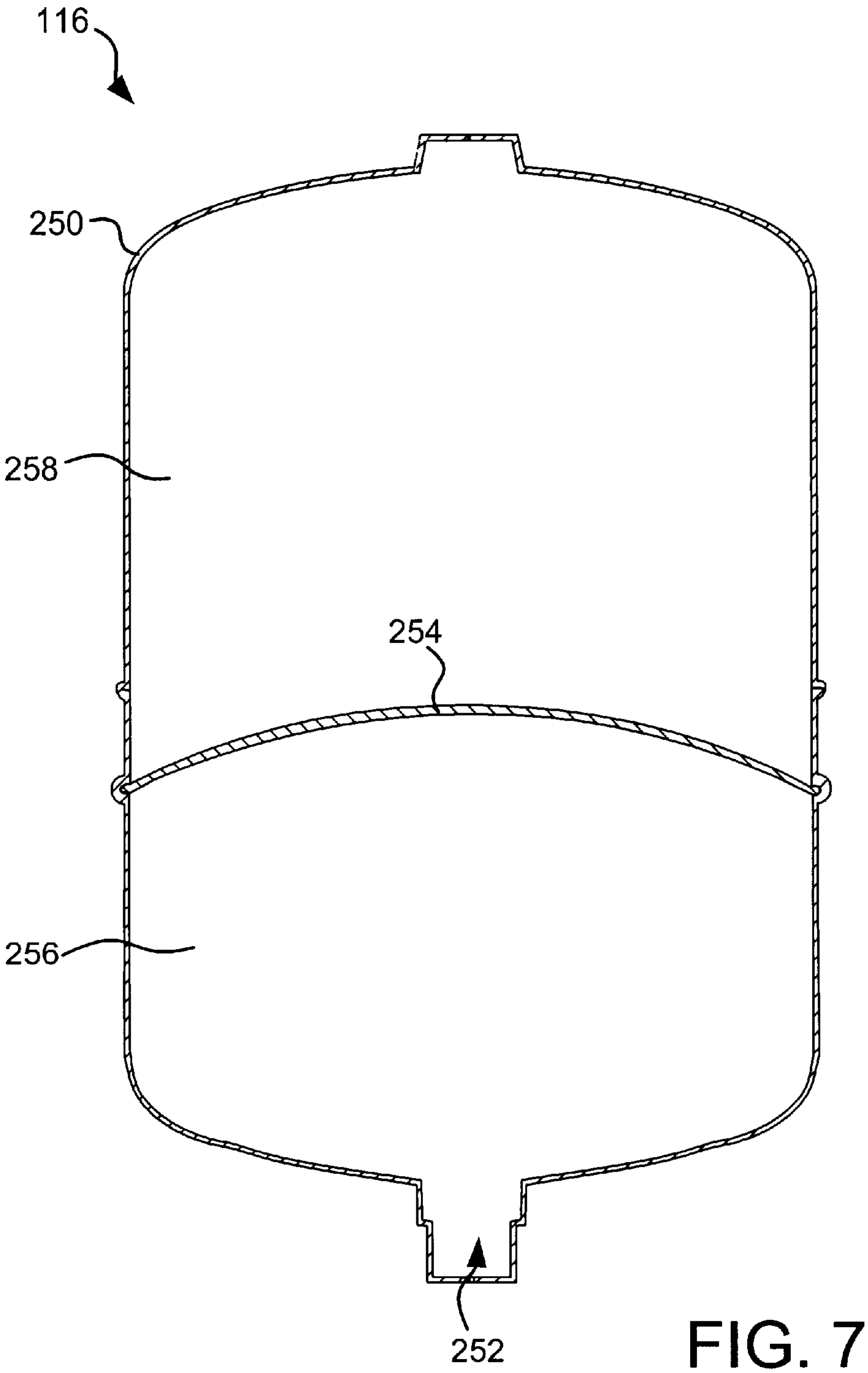
FIG. 7 is a separate sectional view similar to FIG. 6, but with the beverage chamber being partially filled.
Figure 8:
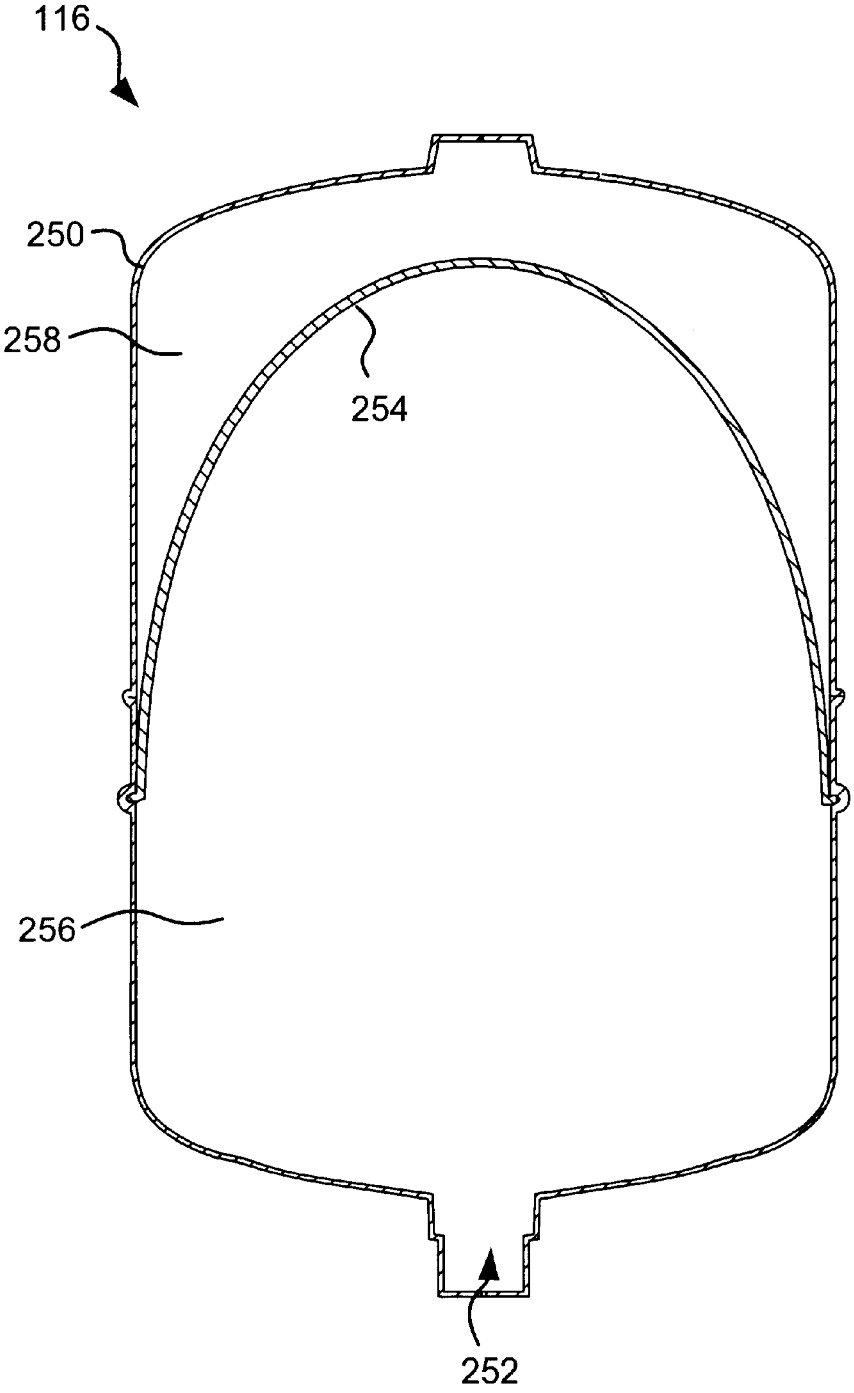
FIG. 8 is a separate sectional view similar to FIG. 7, but with the beverage chamber being more full than in FIG. 7.

In operation, the bottle 108 is placed in the inverted position shown in FIGS. 2–5. Referring to FIG. 1, at that time, beverage will fill the first reservoir 112, as discussed above. This filled status is indicated to the relay 310 by the fluid level switch 302 as described above, and the relay will switch the power switch 274 to connect the power switch power line 272 to the pressure switch power line 275. The second reservoir 116 may initially contain no beverage, so that the gas within the gas chamber 258 presses the barrier 254 against the sides and bottom of the tank so that the beverage chamber 256 has substantially no volume as shown in FIG. 6. In this state where the second reservoir 116 has no beverage or if its beverage level is low then its pressure is also low. This low beverage quantity and pressure status is indicated by the pressure switch 280 closing, and thereby connecting the pump 114 to the power switch power line 272 via the pressure switch power line 275 and the power switch 274. The pump 114 is thereby operated to pump beverage from the first reservoir 112 to the beverage chamber 256 of the second reservoir 116. As the pump 114 increases the quantity of beverage in the beverage chamber 256, the pressure in the beverage chamber 256 also increases. The pressure of the beverage presses against and displaces the barrier 254 so that the beverage chamber 256 expands to accommodate the increasing quantity of beverage as shown in FIGS. 7–8. The pump 114 continues pumping beverage from the first reservoir 112 to the beverage chamber 256 of the second reservoir 116 until the pressure within the beverage chamber rises above the operating pressure range. At that point, the pressure switch 280 opens, thereby disconnecting the pump 114 from the power switch power line 272 and deactivating the pump.

Because the dispenser 118 is connected to the pressurized beverage chamber 256, pressurized beverage is supplied to the dispenser 118. The beverage may be automatically or manually dispensed from the dispenser 118 by opening the dispenser valve 266. As the beverage is dispensed from the dispenser 118, the quantity of beverage within the beverage chamber 256 decreases. The pressure within the beverage chamber 256 also decreases and the barrier 254 contracts the beverage chamber 256. This contraction may continue during several uses of the dispenser 118 without the pump 114 being operated. Thus, users of the dispenser 118 are not annoyed by the constant noise of the pump 114 as they use the dispenser 118, making use of the dispenser 118 a more pleasant experience.

When the pressure within the beverage chamber 256 of the second reservoir 116 drops below the operating range, then the pressure switch 280 closes again. This will again operate the pump 114 so long as sufficient beverage remains within the first reservoir 112 as indicated by the fluid level switch 302 being closed. This cycle of beverage being supplied from the expandable beverage chamber 256 and the pump 114 operating periodically to supply beverage to the beverage chamber 256 continues so long as the first reservoir 112 contains sufficient beverage. When the beverage supply system 100 has emptied the bottle 108, the bottle will, of course, no longer supply beverage to the first reservoir 112, and the beverage level of the first reservoir 112 will drop until the first reservoir no longer contains sufficient beverage to be pumped to the beverage chamber 256 of the second reservoir. At that time, the float 304 of the fluid level switch 302 will also drop, and the fluid level switch 302 will open. The relay 310 will then switch the power switch 274 from the pressure switch power line 275 to the indicator power line 276. With the pressure switch power line 275 disconnected from the power switch power line 272, the pump 114 can no longer be operated, even if the pressure switch 280 is closed. With the indicator power line 276 connected to the power switch power line 272, the indicator light 282 will remain on so long as the fluid level within the first reservoir 112 remains low. The indicator light 282 thereby indicates that the bottle 108 is empty and needs to be replaced with a new bottle. When the bottle 108 is replaced, then operation of the beverage supply system 100 continues as described above.

If the beverage supply system 100 needs to be disconnected from the dispenser 118, the bottle 108 can be removed. The beverage within the system 100 can then be drained by simply opening the dispenser valve 266. The dispenser 118 can then be disconnected. Alternatively, a valve could be included on the dispenser supply line 260. This valve could be closed before disconnecting the dispenser 118.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, the second reservoir could operate without a solid barrier by having the second reservoir contain a compressed gas that is further compressed by the beverage itself as the second reservoir is filled. Also, the electrical components could be configured in many different ways. Numerous other changes may be made which will readily suggest themselves to those skilled in the art and which are encompassed in the spirit of the invention disclosed and as defined in the appended claims.

What is claimed is:

1. A beverage supply system comprising:

a beverage container having a bottom outlet;

a first reservoir connected to the beverage container bottom outlet to receive beverage from the beverage container under force of gravity;

a pump connected to the first reservoir;

a second reservoir connected to the pump, the second reservoir defining an expandable beverage chamber, receiving beverage pumped from the first reservoir only when a first quantity of beverage in the first reservoir is within a first quantity range and a second quantity of beverage in the second reservoir is below a second quantity range; and a beverage dispenser connected to the second reservoir.

2. The supply system of claim 1, wherein the pump is deactivated if either the first quantity of beverage in the first reservoir is below the first quantity range or the second quantity of beverage in the second reservoir is above the second quantity range.

3. The supply system of claim 1, wherein the second reservoir comprises a tank containing the second quantity of beverage in the second reservoir and a solid barrier within the tank that presses against the second quantity of beverage in the second reservoir, the barrier and the tank defining the beverage chamber.

4. The supply system of claim 3, wherein the second quantity of beverage displaces the barrier as the second quantity of beverage in the second reservoir increases.

5. The supply system of claim 4, wherein the barrier is a flexible diaphragm within the tank.

6. The supply system of claim 3, wherein the barrier increases a pressure within the beverage chamber in the second reservoir as the second quantity of beverage in the second reservoir increases.

7. The supply system of claim 6, further comprising a pressure switch responsive to the pressure within the beverage chamber and operative to deactivate the pump when the second quantity of beverage is above the second quantity range.

8. The supply system of claim 7, further comprising a fluid level switch within the first reservoir, the fluid level switch operative in response to a beverage level in the first reservoir.

9. The supply system of claim 1, wherein the pump, the first reservoir, and the second reservoir are positioned in an enclosed space defined by a housing that supports the beverage container.

10. The supply system of claim 9, wherein the housing comprises a unitary member.

11. The supply system of claim 10, wherein the unitary member comprises a polymer material.

12. The supply system of claim 11, wherein the housing includes a door selectively providing access to the enclosed space, the door comprising the polymer material.

13. The supply system of claim 1, further including an indicator light that indicates when the first quantity of beverage within the first reservoir is below the first quantity range.

14. A beverage supply system comprising:

a first reservoir adapted to receive beverage from a beverage container under force of gravity;

a pump connected to the first reservoir; and a second reservoir connected to the pump, the second reservoir comprising a solid barrier adapted to press against a second quantity of beverage within the second reservoir as the second quantity of beverage within the second reservoir displaces the barrier to produce a pressure within the second quantity of beverage within the second reservoir; and wherein the second reservoir is adapted to supply beverage to a beverage dispenser without the pump being operated; and wherein the pump is activated to pump beverage from the first reservoir to the second reservoir when a first quantity of beverage in the first reservoir is within a first quantity range and the second quantity of beverage in the second reservoir is below a second quantity range.

15. The supply system of claim 14, wherein the pump is deactivated if either the first quantity of beverage in the first reservoir is below the first quantity range or the second quantity of beverage in the second reservoir is above the second quantity range.

16. The supply system of claim 14, wherein the second reservoir comprises a tank and the barrier is secured within the tank.

17. The supply system of claim 16, wherein the barrier is a flexible diaphragm.

18. The supply system of claim 17, wherein the barrier increases the pressure within the second quantity of beverage in the second reservoir as the second quantity of beverage in the second reservoir increases.

19. The supply system of claim 18, further comprising a pressure switch responsive to the pressure within the second quantity of beverage in the second reservoir and operative to deactivate the pump when the second quantity of beverage in the second reservoir is above the second quantity range.

20. The supply system of claim 14, wherein the pump, the first reservoir, and the second reservoir are positioned in an enclosed space defined by a housing that supports the beverage container.

21. The supply system of claim 20, wherein the housing comprises a unitary polymer member defining the enclosed space and a door spanning an opening in the unitary polymer member.

22. The supply system of claim 14, further including an indicator light that indicates when the first quantity of beverage within the first reservoir is below the first quantity range.

23. A beverage supply system comprising:

a housing;

a first reservoir in the housing adapted to receive beverage from a beverage container supported by the housing;

a pump in the housing connected to the first reservoir;

a second reservoir in the housing connected to the pump, such that the pump is adapted to pressurize the second reservoir, wherein the pump is activated to pump beverage from the first reservoir to the second reservoir when a first quantity of beverage in the first reservoir is within a first quantity range and a second quantity of beverage in the second reservoir is below a second quantity range; and a beverage dispenser connected to the second reservoir, wherein the second reservoir is adapted to supply beverage to the beverage dispenser without the pump being operated.

24. The supply system of claim 23, wherein the second reservoir includes a barrier adapted to press against the second quantity of beverage within the second reservoir as the second quantity of beverage within the second reservoir displaces the barrier to produce a pressure within the second quantity of beverage within the second reservoir.

25. The supply system of claim 24, wherein the pump is deactivated if either the first quantity of beverage in the first reservoir is below the first quantity range or the second quantity of beverage in the second reservoir is above the second quantity range.

26. The supply system of claim 24, wherein the second reservoir comprises a tank and the barrier includes a flexible diaphragm secured to the tank.

27. The supply system of claim 24, wherein the barrier increases the pressure within the second quantity of beverage in the second reservoir as the second quantity of beverage in the second reservoir increases, and a pressure switch is responsive to the pressure within the second quantity of beverage in the second reservoir and is operative to deactivate the pump if the second quantity of beverage within the second reservoir is above the second quantity range.

28. The supply system of claim 23, further including an indicator light that indicates when the first quantity of beverage within the first reservoir is below the first quantity range.

29. A method of supplying beverage from a beverage container to a beverage dispenser, the method comprising acts of:

supplying a beverage from a beverage container to a first reservoir under force of gravity;

pumping the beverage from the first reservoir to an expandable pressurized chamber of a second reservoir when a first quantity of beverage in the first reservoir is within a first quantity range and a second quantity of beverage in the second reservoir is below a second quantity range; and intermittently connecting the pressurized chamber to an outlet of a beverage dispenser to supply beverage from the second reservoir to the beverage dispenser without pumping the beverage from the second reservoir to the beverage dispenser.

30. The method of claim 29, wherein the pumping act is terminated if either the first quantity of beverage in the first reservoir is below the first quantity range or the second quantity of beverage in the second reservoir is above the second quantity range.

31. The method of claim 29, wherein the second reservoir comprises a tank and the step of pumping the beverage increases a pressure within the tank.

32. The method of claim 29, wherein the connecting act comprises opening a valve between the second reservoir and an outlet of the beverage dispenser.

33. The method of claim 29, further comprising an act of indicating to a user when the first quantity of beverage within the first reservoir is below the first quantity range.

* * * * *